(12) United States Patent
Lachwani et al.

(10) Patent No.: US 9,113,358 B1
(45) Date of Patent: Aug. 18, 2015

(54) CONFIGURABLE NETWORK VIRTUALIZATION

(71) Applicant: Google Inc., Mountain View, CA (US)

(72) Inventors: Manish Lachwani, Sunnyvale, CA (US); Jay Srinivasan, San Francisco, CA (US); Pratyus Patnaik, San Francisco, CA (US)

(73) Assignee: Google Inc., Mountain View, CA (US)

( * ) Notice: Subject to any disclaimer, the term of this patent is extended or adjusted under 35 U.S.C. 154(b) by 360 days.

(21) Appl. No.: 13/680,671

(22) Filed: Nov. 19, 2012

(51) Int. Cl.
*H04L 12/26* (2006.01)
*H04W 24/06* (2009.01)

(52) U.S. Cl.
CPC .............. *H04W 24/06* (2013.01); *H04L 43/08* (2013.01); *H04L 43/0894* (2013.01); *H04L 43/10* (2013.01)

(58) Field of Classification Search
CPC ... H04W 24/002; H04W 24/04; H04W 24/06; H04W 24/08; H04W 72/00; H04W 72/04; H04W 72/042; H04W 43/08; H04W 43/0829; H04W 43/0852; H04W 43/0888; H04W 43/0894; H04W 43/10
See application file for complete search history.

(56) References Cited

U.S. PATENT DOCUMENTS

| | | | |
|---|---|---|---|
| 4,953,084 A | 8/1990 | Meloy et al. | |
| 6,131,188 A | 10/2000 | Goebel | |
| 6,145,122 A | 11/2000 | Miller et al. | |
| 6,151,701 A | 11/2000 | Humphreys et al. | |
| 6,269,330 B1 * | 7/2001 | Cidon et al. | 714/43 |
| 6,598,221 B1 | 7/2003 | Pegatoquet et al. | |
| 6,829,733 B2 | 12/2004 | Richardson et al. | |
| 6,958,977 B1 * | 10/2005 | Mitrani et al. | 370/252 |
| 7,051,238 B2 | 5/2006 | Gardner et al. | |
| 7,418,697 B2 | 8/2008 | Gryko et al. | |
| 7,805,707 B2 | 9/2010 | Pouliot | |
| 7,870,540 B2 | 1/2011 | Zare et al. | |
| 7,991,747 B1 | 8/2011 | Upadhyay et al. | |
| 8,370,810 B2 | 2/2013 | Oda | |
| 8,479,166 B2 | 7/2013 | Nir-Buchbinder et al. | |
| 8,504,987 B2 | 8/2013 | Li et al. | |
| 8,611,233 B2 * | 12/2013 | Davis et al. | 370/250 |
| 8,626,827 B1 * | 1/2014 | Cabrera et al. | 709/203 |
| 8,671,080 B1 | 3/2014 | Upadhyay et al. | |
| 2002/0010710 A1 | 1/2002 | Binnig | |
| 2002/0040470 A1 | 4/2002 | Guthrie et al. | |
| 2002/0166081 A1 | 11/2002 | Richardson et al. | |
| 2003/0221184 A1 | 11/2003 | Gunjal et al. | |
| 2004/0194072 A1 | 9/2004 | Venter | |

(Continued)

OTHER PUBLICATIONS

"debugserver", [online] [retrieved on Apr. 22, 2014] Retrieved from the Internet: <http://iphonedevwiki.net/index.php/Debugserver>.

(Continued)

*Primary Examiner* — Candal Elpenord
(74) *Attorney, Agent, or Firm* — McDonnell Boehnen Hulbert & Berghoff LLP

(57) ABSTRACT

A network profile describes one or more characteristics of a network including bandwidth, latency, rate of packet loss, duplication, corruption, or reordering, and so forth. Using the network profile, one or more adjustments are made to network traffic between a server device and an application executing on a client device. These adjustments virtualize the profiled network and emulate how the profiled network affects traffic. Such virtualization may enable an application to be tested under different network conditions corresponding to different network profiles.

20 Claims, 11 Drawing Sheets

(56) References Cited

U.S. PATENT DOCUMENTS

| | | | |
|---|---|---|---|
| 2005/0220035 A1* | 10/2005 | Ling et al. | 370/252 |
| 2005/0273776 A1 | 12/2005 | Guilford | |
| 2005/0278707 A1 | 12/2005 | Guilford | |
| 2006/0059253 A1 | 3/2006 | Goodman et al. | |
| 2006/0242709 A1 | 10/2006 | Seinfeld et al. | |
| 2007/0288644 A1 | 12/2007 | Rojas et al. | |
| 2009/0150420 A1 | 6/2009 | Towner | |
| 2009/0225669 A1* | 9/2009 | Qin et al. | 370/249 |
| 2010/0095021 A1* | 4/2010 | Samuels et al. | 709/235 |
| 2010/0153055 A1* | 6/2010 | Mucha et al. | 702/122 |
| 2010/0291907 A1* | 11/2010 | MacNaughtan et al. | 455/414.1 |
| 2011/0047597 A1 | 2/2011 | Mahaffey et al. | |
| 2011/0282642 A1* | 11/2011 | Kruger et al. | 703/27 |
| 2011/0289483 A1 | 11/2011 | Williams et al. | |
| 2012/0260344 A1 | 10/2012 | Maor et al. | |
| 2013/0060890 A1 | 3/2013 | Lee et al. | |
| 2013/0152047 A1 | 6/2013 | Moorthi et al. | |
| 2013/0185798 A1 | 7/2013 | Saunders et al. | |
| 2013/0227636 A1 | 8/2013 | Bettini et al. | |
| 2013/0276061 A1 | 10/2013 | Chebiyyam et al. | |
| 2013/0282892 A1 | 10/2013 | Levi et al. | |
| 2014/0020096 A1 | 1/2014 | Khan et al. | |
| 2014/0056153 A1* | 2/2014 | Monnes et al. | 370/252 |
| 2014/0082729 A1 | 3/2014 | Shim et al. | |

OTHER PUBLICATIONS

Chowdhury, "Non Final Office Action dated Feb. 13, 2014", U.S. Appl. No. 13/631,919, The United States Patent and Trademark Office, Feb. 13, 2014.

LLDB.LLVM.ORG, "The LLDB Debugger", [online] [retrieved Apr. 22, 2014] Retrieved from the Internet: <http://lldb.llvm.org/>.

Charles Lu, "Debug Java applications remotely with Eclipse", developerWorks, IBM, Dec. 9, 2008, [online] [retrieved on Apr. 22, 2014] Retrieved from the Internet: <http://www.ibm.com/developerworks/library/os-eclipse-javadebug/index.html>.

Javin Paul, "How to setup Java remote debugging in Eclipse", Javarevisited—Blog about Java programming language, FIX Protocol, Tibco Rendezvous and related Java technology stack, Feb. 25, 2011, [online] [retrieved Apr. 22, 2014] Retrieved from the Internet: <http://javarevisited.blogspot.com/2011/02/how-to-setup-remote-debugging-in.html>.

Pyzocha, "Non Final Office Action dated May 13, 2014", U.S. Appl. No. 13/655,667, The United States Patent and Trademark Office, May 13, 2014.

Pyzocha, "Non Final Office Action dated Sep. 9, 2014", U.S. Appl. No. 13/655,667, The United States Patent and Trademark Office, Sep. 9, 2014.

Seo, et al., "Analysis on maliciousness for mobile applications", 2012 Sixth International Conference on Innovative Mobile and Internet Services in Ubiquitous Computing, IEEE, 2012, pp. 126-129.

Bakos, et al., "Lightweight Error Correction Coding for System-Level Interconnects", IEEE Transactions on Computers, vol. 56, No. 3, Mar. 2007, pp. 1-16 [online], [retrieved on Jul. 2, 2014]. Retrieved from the Internet <URL:http://kona.ee.pitt.edu/steve/Recent%20Publications/TC_2007_TC-0414-1105-1.pdf>.

Chowdhury, "Notice of Allowance dated Jul. 2, 2014", U.S. Appl. No. 13/631,919, The United States Patent and Trademark Office, Jul. 2, 2014.

Coyer, "Non Final Office Action dated Jun. 5, 2014", U.S. Appl. No. 13/721,632, The United States Patent and Trademark Office, Jun. 5, 2014.

Dearle, "Software Deployment, Past, Present and Future", IEEE 2007, pp. 1-16 [online], [retrieved on Jul. 2, 2014]. Retrieved from the Internet <URL:http://www.cs.tufts.edu/comp/250SA/papers/dearle2007.pdf>.

Guglielmo, et al., "Model-Driven Design and Validation of Embedded Software", 2011 ACM, pp. 98-104 [online], [retrieved on Jul. 2, 2014]. Retrieved from the Internet <URL:http://dbonline.igroupnet.com/ACM.TOOLS/Rawdata/Acm1106/fulltext/1990000/1982616/p98-guglielmo.pdf>.

Rueher, et al., "Capturing Software Processes Through the Generated Objects", 1988, pp. 148-152 [online], [retrieved on Jul. 2, 2014]. Retrieved from the Internet <URL:http://delivery.acm.org/10.1145/80000/75138/p148-rueher.pdf>.

* cited by examiner

CONFIGURABLE NETWORK VIRTUALIZATION

BACKGROUND

With the growing popularity of mobile devices, there is an increasing demand for applications, or apps, to run on such devices. To ensure that an app is reliable, it may be tested by the app developer(s) or tester(s). Because the app may be tested under conditions that may not correspond to real-world conditions of varying network properties, potential bugs or usability issues in the app may go unidentified during the testing. Such problems may be revealed as end users run the app under various conditions, potentially leading to degradation in the end user experience or enjoyment of the app.

Figure 1:
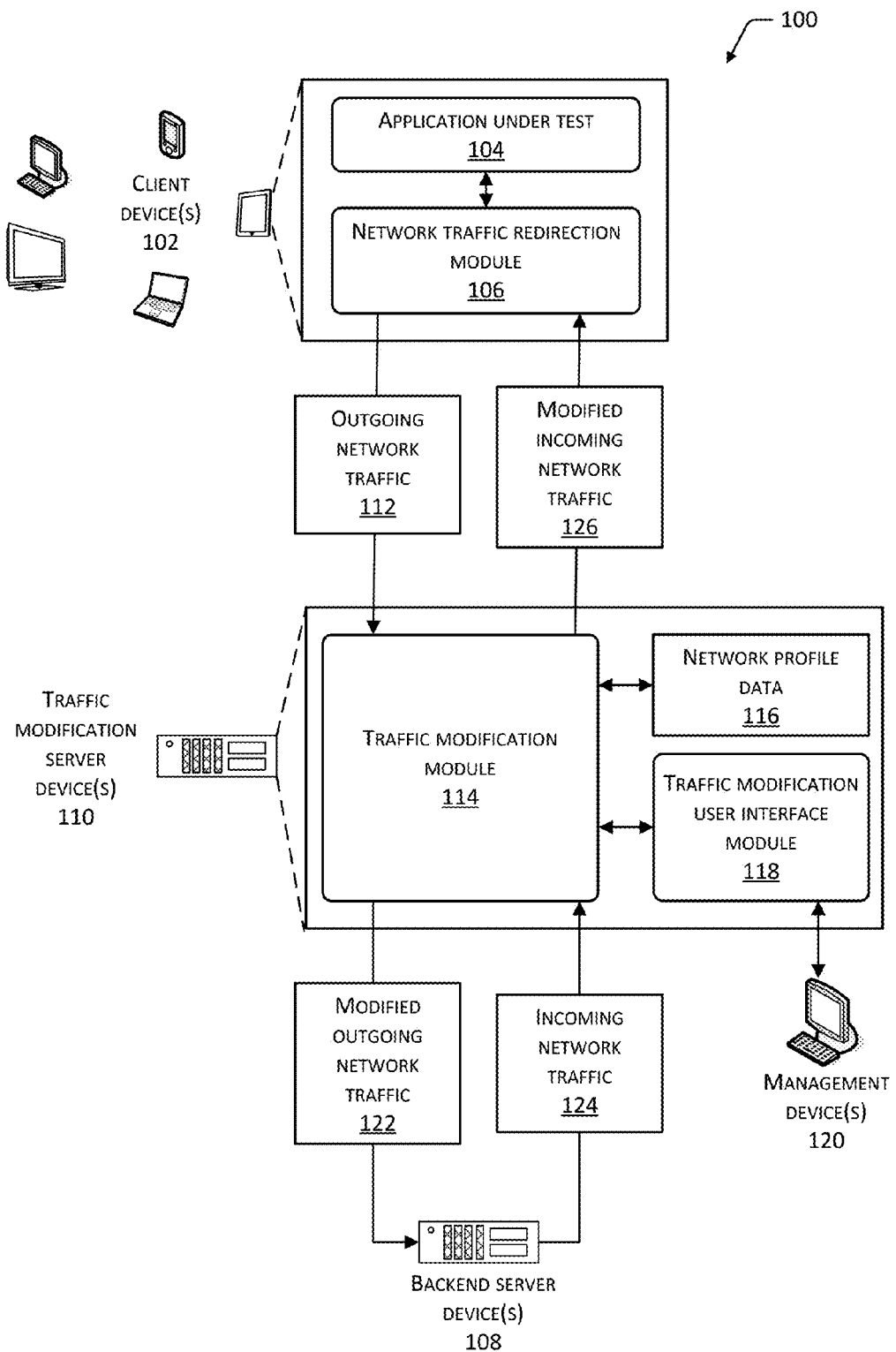
FIG. 1 depicts an environment for configurable network virtualization through dynamic traffic adjustment.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes embodiments of systems, methods, and computer-readable media for configurable network virtualization through dynamic adjustment of network traffic. Computing devices such as smartphones, tablet computers, and the like operate with varying network service conditions of a speed, link quality, and so forth when using wireless local area networks (WLAN), wireless wide area networks (WWAN), or other wireless technologies. Accordingly, an application that employs a network connection may perform differently as the device running the application transitions between different networks. For example, the user device may physically move between areas having differing network service conditions.

Adjustments may be made to the network traffic between a server device and an application executing on a client device. These adjustments may serve to emulate data transfer on different networks, under different network conditions, and so forth. The network traffic may be adjusted to emulate traffic over a network profile with previously determined characteristics of bandwidth, latency, or rate of packet loss, duplication, corruption, or reordering, or other network characteristics. Such emulation of network characteristics enables a virtualization of the network.

Network virtualization may enable an application to be tested under different network conditions corresponding to different network profiles, without costly field testing of an application under real-world network conditions. For example, an app developer may have an app that runs on a particular mobile device running a particular mobile operating system. The developer may wish to test the functionality, performance, usability, or other aspects of the app as it communicates over a 3G WAN provided by a telecommunication service provider BT&T with a particular signal strength (e.g., 3 bars). Such testing may enable the optimization or verification of an application's functionality, performance, usability, and so forth on one or more networks with various characteristics.

A network profile may include one or more parameters describing characteristics of a network. The parameters may have been previously determined through measurements of the network bandwidth, latency, or rate of packet loss, duplication, corruption, or reordering, or other network characteristics. The developer may request that network traffic to and from the device be adjusted to emulate the characteristics for the network and virtualize the network, enabling the app to be tested under a controlled set of network conditions. Results of testing the app under various network conditions may be employed to fix bugs in the app, to improve the performance or the usability of the app, or for other purposes.

FIG. 1 shows an example environment 100 in which various implementations of network traffic adjustment may operate. The various devices and modules of the environment 100 may communicate with one another and with external devices via one or more networks. Such networks may include public networks such as the Internet, private networks such as an institutional or personal intranet, or some combination of private and public networks. The networks may also include any type of wired or wireless network, including but not limited to local area networks (LANs), personal area networks (PANs), WLANs, WWANs, and so forth. For example, the WLANs may include networks compliant with the WiFi standard while the WWANs may include networks compliant with the WiMax or mobile communications networks such as 3G, 4G, Long Term Evolution (LTE), Global System for Mobile Communication (GSM), General Packet Radio Service (GPRS), Enhanced Data Rates for GSM Evolution (EDGE), Enhanced EDGE, High Speed Packet Access (HSPA), HSPA+, and so forth. The networks may utilize communications protocols, including packet-based or datagram-based protocols such as internet protocol (IP), transmission control protocol (TCP), user datagram protocol (UDP), asynchronous transfer mode, or other types of protocols.

The environment 100 may include one or more client devices 102 that are owned by, operated by, or otherwise associated with one or more users. In some implementations, the client device(s) 102 include one or more mobile computing devices such as smartphones, tablet computers, electronic book readers, and the like. However, implementations are not so limited, and the client device(s) 102 may include any other type of computing device that is able to communicate with other devices over a network, including but not limited to desktop computers, personal computers, laptop computers, wearable computers, implanted computers, thin clients, terminals, game consoles, mobile gaming devices, and the like. In some implementations, the client device(s) 102 may include emulation software running on a first device and emulating a second, different device. For example, the client device(s) 102 may include an emulation of a mobile device such as a smartphone, the emulation executed on a personal computer, a workstation, a server computer, or other type of device.

In some implementations, the client device(s) 102 may include one or more applications under test 104 stored in memory and executed by a processor of the client device(s) 102. The application under test 104 may include any software module, program, or application that is executable on a computing device. The application under test 104 may be a stand-alone application or may operate in conjunction with one or more other software modules, libraries, or application programming interfaces (APIs). In some cases, the application under test 104 may include functionality to communicate with other devices over a network connection. Any type of the application under test 104 may be supported by implementations, including games, document processing applications, media players, chat programs, mail clients, social networking applications, navigation programs, mapping programs, or other types of applications. In some cases, the application under test 104 may include one or more modules of an operating system (OS).

The client device(s) 102 may also include a network traffic redirection module 106. In some implementations, the network traffic redirection module 106 may be part of an OS of the client device(s) 102. For example, the network traffic redirection module 106 may be included in a network communications stack of an OS, or may be included in an OS utility that enables a user of the client device(s) 102 to select a network for communications between the client device(s) 102 and other devices. In some implementations, the network traffic redirection module 106 may be an application installed on the client device(s) 102 and not part of the OS. In some implementations, the network traffic redirection module 106 may operate to redirect outgoing network traffic to an IP address of the traffic modification server device(s) 110. The client device(s) 102 may include other modules, and are described further with reference to FIG. 5.

The environment 100 may also include one or more server computing devices, such as backend server device(s) 108 and traffic modification server device(s) 110. Such servers may include any type of computing device including, but not limited to, network servers, rack-mounted servers, workstations, desktop computers, laptop computers, tablet computers, mobile computing devices, virtual servers, cloud resources, and the like. Further, the server devices may include one or more computing devices that operate in a cluster or other grouped configuration to share resources, balance load, increase performance, provide fail-over support or redundancy, or for other purposes. The servers may also include one or more hardware modules and one or more software modules, processes, or applications to perform tasks as described herein.

As shown in FIG. 1, the environment 100 may include one or more backend server devices 108. The backend server device(s) 108 may provide one or more services accessible to the application under test 104 over a network. In some cases, the application under test 104 may participate in a network connection or a communication session with the backend server device(s) 108, and send or receive data to or from a service provided by the backend server device(s) 108. The application under test 104 may be associated with the service on the backend server device(s) 108, for example in a client-server relationship.

In the course of communicating with the backend server device(s) 108, the application under test 104 may send outgoing network traffic 112 toward the backend server device(s) 108, with a destination address corresponding to the backend server device(s) 108. In some implementations, the network traffic redirection module 106 may function as an intermediary in such communication, receiving the outgoing network traffic 112 from the application under test 104 and sending it over a network. In some implementations, the application under test 104 may itself send the outgoing network traffic 112. Implementations support any type of network communications traffic for outgoing network traffic 112 or the other network traffic depicted in FIG. 1. For example, the traffic described may employ any protocol at any level of the Open Systems Interconnection (OSI) model for computer network communications.

In some implementations, the communications traffic between the client device(s) 102 and the backend server device(s) 108 is intercepted by one or more traffic modification server device(s) 110 and modified for network virtualization as described herein before being sent on to the backend server device(s) 108. The traffic modification server device(s) 110 are described further with reference to FIG. 6.

Figure 7:
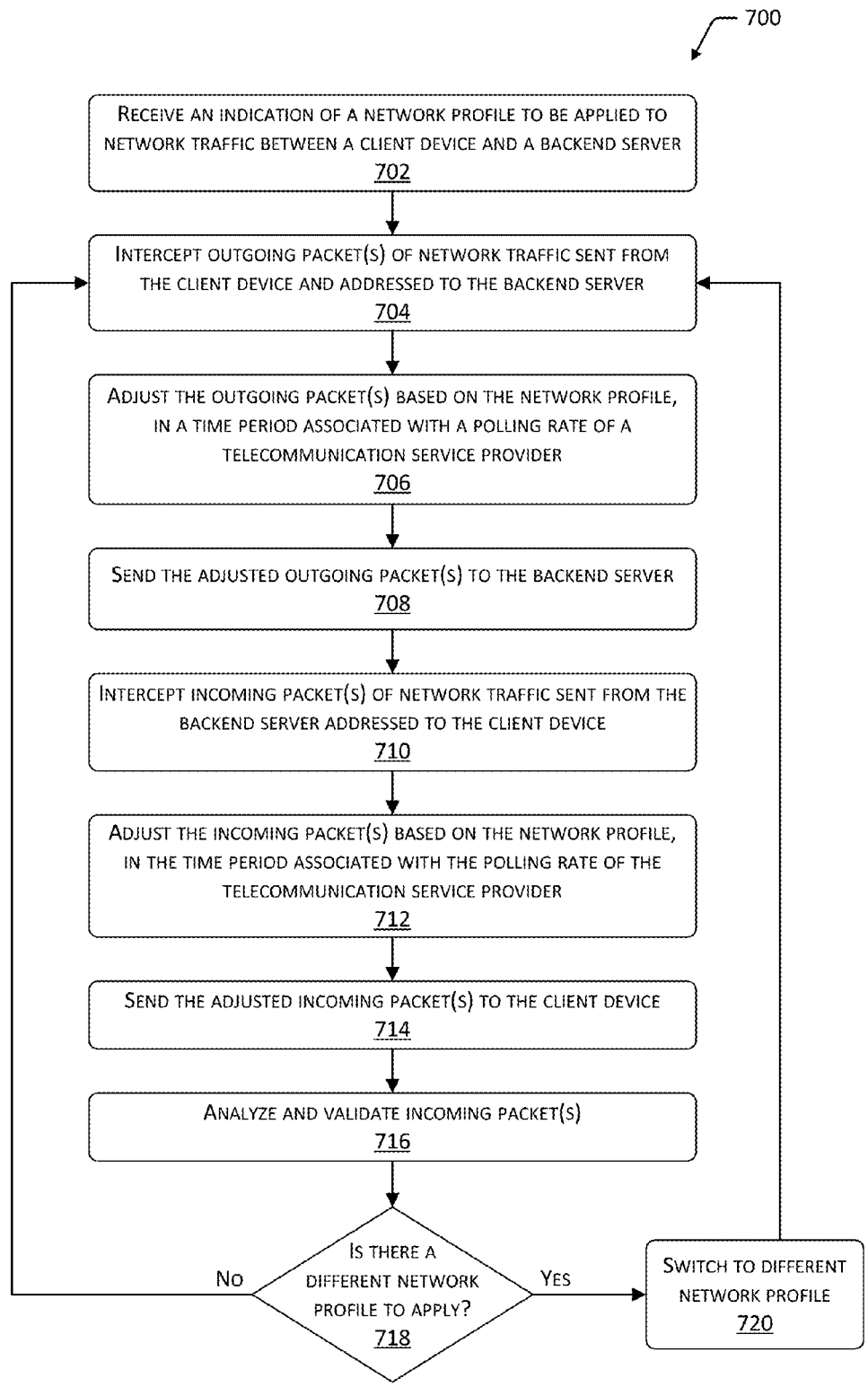
FIG. 7 depicts a flow diagram of a process for network virtualization through dynamic traffic adjustment.
Figure 8:
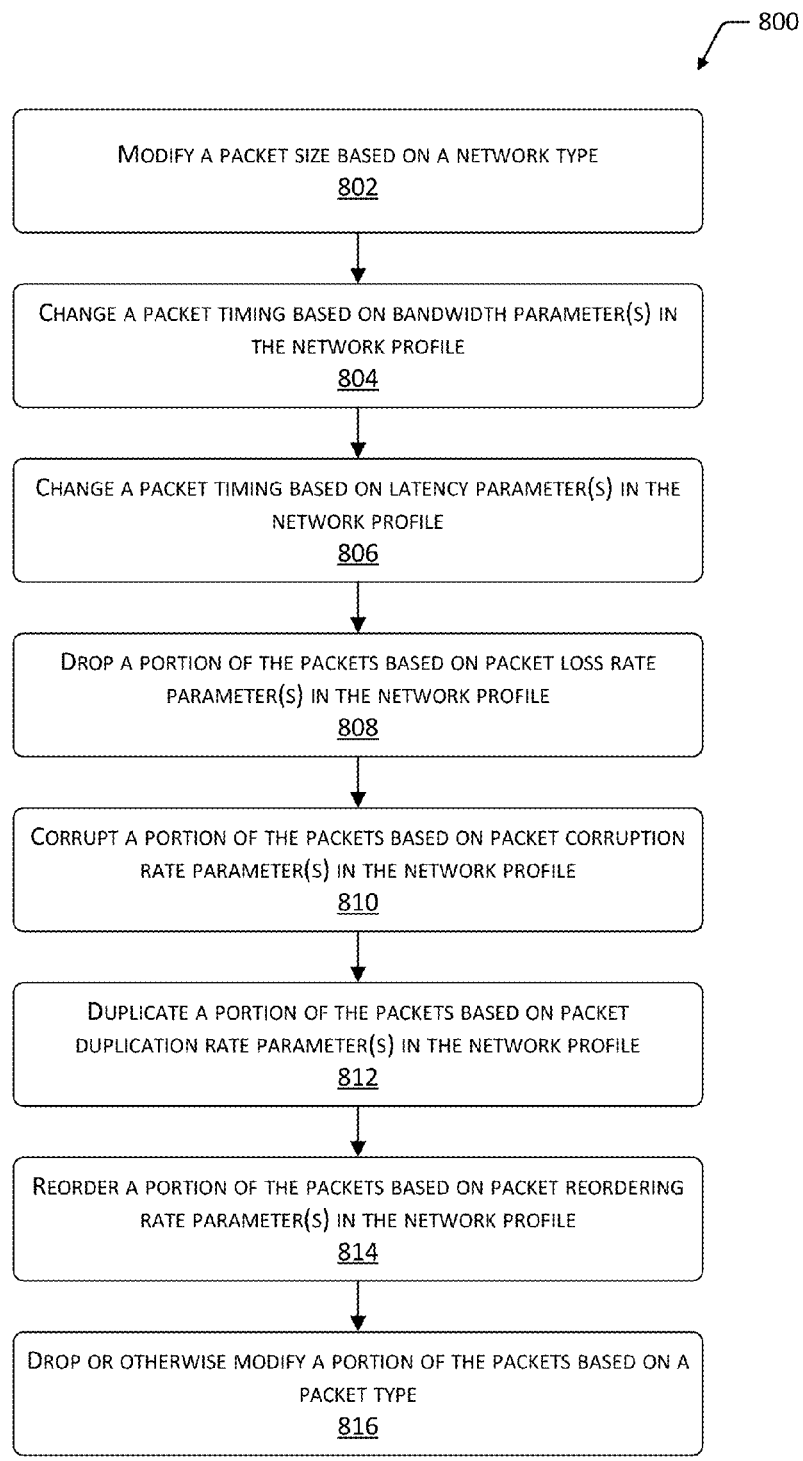
FIG. 8 depicts a flow diagram of a process for traffic adjustment based on one or more parameters of a network profile.
Figure 9:
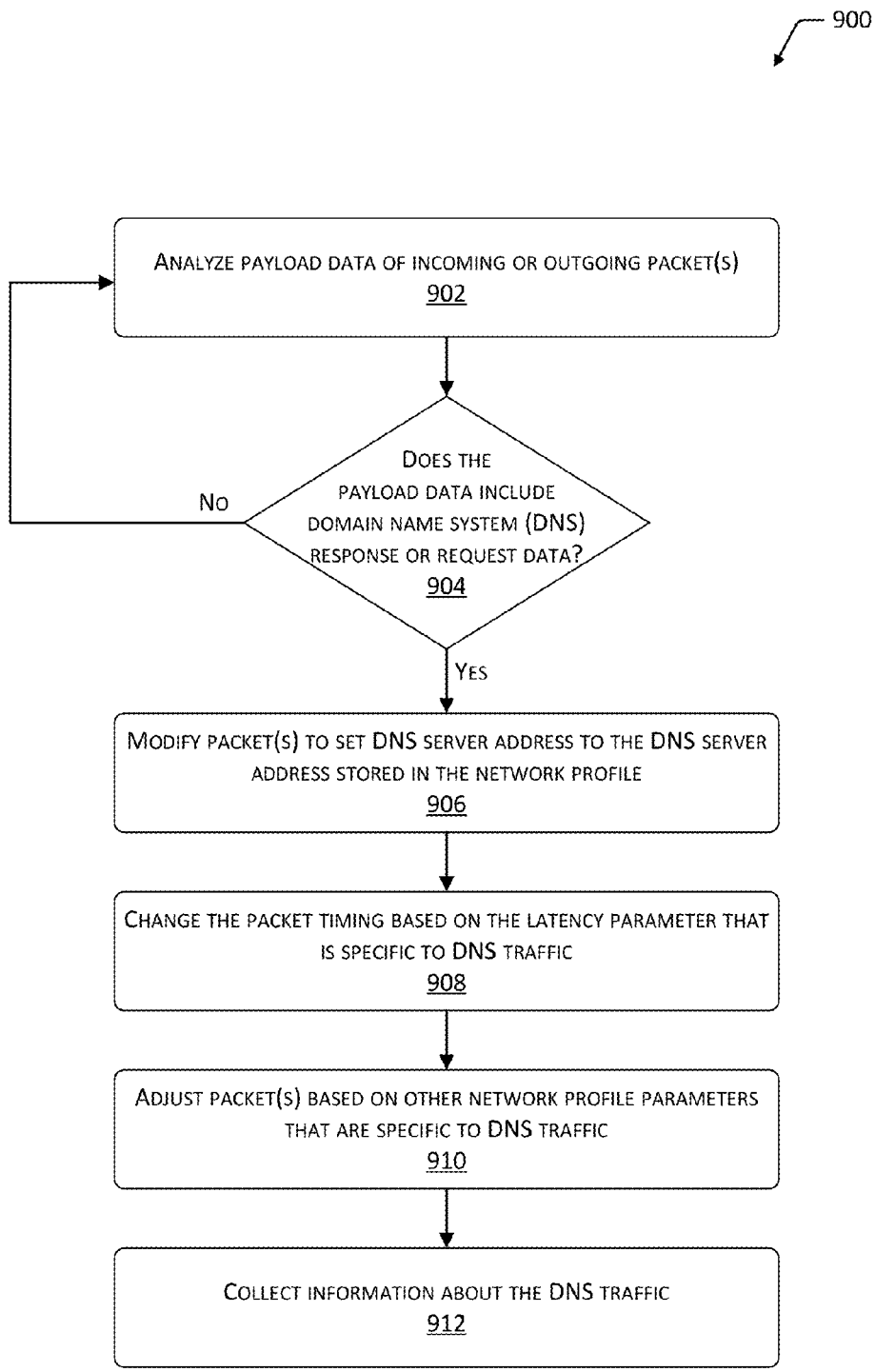
FIG. 9 depicts a flow diagram of a process for traffic adjustment based on one or more parameters of a network profile, for traffic that includes domain name system (DNS) traffic.

The traffic modification server device(s) 110 may include a traffic modification module 114 to perform traffic modification operations as described further herein with reference to FIGS. 7-9.

The traffic modification server device(s) 110 may also store network profile data 116 to be employed by the traffic modification module 114 in traffic modification operations. The network profile data 116 may include data for a plurality of network profiles, each network profile associated with a plurality of network profile parameters that describe one or more characteristics of a network. The network profile data 116 is described further with reference to FIG. 2.

In some implementations, the traffic modification server device(s) 110 may provide a traffic modification user interface module 118, to enable a user to manage or control traffic modification operations performed by the traffic modification module 114. In some cases, the traffic modification user interface module 118 may be provided as a web site. The traffic modification user interface module 118 may accept one or more commands from a user requesting network virtualization. Such commands may be entered individually, or included in a script or program that executes to send commands to the traffic modification user interface module 118 or the traffic modification module 114. An example of the traffic modification user interface module 118 is described further with reference to FIG. 4.

In some implementations, the environment 100 may include one or more management device(s) 120, which a user may employ to interact with the traffic modification user interface module 118. In some cases, a user may interact with the traffic modification user interface module 118 through the client device(s) 102, through various components of the traffic modification server device(s) 110, or through other means.

The traffic modification module 114 may receive the outgoing network traffic 112 from the client device(s) 102, modify the outgoing network traffic 112 to provide a virtualized network, and send modified outgoing network traffic 122 to the backend server device(s) 108. The backend server device(s) 108 may generate and send incoming network traffic 124 that is addressed to the client device(s) 102 or to the application under test 104. In some cases, the incoming network traffic 124 may be response traffic, generated and sent by the backend server device(s) 108 in response to the modified outgoing network traffic 122.

The incoming network traffic 124 may be intercepted by the traffic modification server device(s) 110, and may be modified by the traffic modification module 114 to virtualize a network. The modified incoming network traffic 126 may then be sent to the client device(s) 102, to the network traffic redirection module 106, to the application under test 104, or to another module of the client device(s) 102.

In the example of FIG. 1, the traffic modification server device(s) 110 are situated in a network topology between the client device(s) 102 and the backend server device(s) 108, intercepting and modifying traffic sent between the client device(s) 102 and the backend server device(s) 108. In some implementations, the traffic modification server device(s) 110 may function as a network proxy server, and the traffic redirection module 106 may configured to redirect the outgoing network traffic 112 to a network address (e.g., IP address) of the traffic modification server device(s) 110.

In some implementations, a first type of network may connect the client device(s) 102 to the traffic modification server device(s) 110, and a second type of network may connect the traffic modification server device(s) 110 to the backend server device(s) 108. In some implementations, the connection between the client device(s) 102 and the traffic modification server device(s) 110 may be over a WiFi network that conforms to an IEEE 802.11 family of communications standards, such as 802.11g, 802.11n, and so forth. In some implementations, the connection between the client device(s) 102 and the traffic modification server device(s) 110 may be over a Bluetooth connection or other type of wireless connection. In some cases, this connection may be a wired network connection, such as a universal serial bus (USB) connection compliant with the standards promulgated by the USB Implementers Forum, Inc. of Beaverton, Oreg.

In some implementations, the connection between the traffic modification server device(s) 110 and the backend server device(s) 108 may be over a wired network such as a T1 or T3 line. Both connections may be high speed and high quality connections, to ensure that degradation of the network traffic is controlled through network traffic modifications made by the traffic modification server device(s) 110. Implementations support any type of network connection between the devices shown in FIG. 1 or other devices.

In some implementations, the client device(s) 102 may be included in a cloud of host devices that may be remotely controlled for testing, auditing, or validation of applications as described in U.S. patent application Ser. No. 13/631,919, filed on Sep. 29, 2012, titled "Application Validation Through Object Level Hierarchy Analysis," and in U.S. patent application Ser. No. 13/655,667, filed on Oct. 19, 2012, titled "Application Auditing Through Object Level Code Inspection," both of which are incorporated by reference into this disclosure.

The traffic modification server device(s) 110 and its traffic modification module 114 may operate to intercept and modify network traffic to and from any number of application(s) under test 104 executing on any number of client device(s) 102, and to and from any number of backend server device(s) 108. In cases where traffic between multiple client device(s) 102, multiple application(s) under test 104, or multiple backend server device(s) 108 is being intercepted and modified, the traffic modification module 114 may operate to define a plurality of sub-channels where each sub-channel carries traffic between a client device 102 running an application under test 104 and a backend server device 108. In such cases, the traffic modification module 114 may multiplex the intercepted traffic based on an identifier (e.g., an IP address or other identifier) of one or both of the client device 102 and the backend server device 108.

In cases where the traffic modification module 114 is modifying multiple streams of traffic carried on multiple sub-channels, different network profiles may be applied to the multiple streams of traffic to virtualize different networks. In some implementations, a network channel to or from the traffic modification server device(s) 110 may have a measured bandwidth that is greater than or equal to the sum of the emulated bandwidths of the multiple sub-channels defined within the channel. In some implementations, the network traffic on each of the sub-channels may be prioritized based on a prioritization of testing for various applications under test 104, or based on other considerations.

For example, where the network connection between the traffic modification server device(s) 110 and the backend server device(s) 108 (or the client device(s) 102) has a bandwidth of 1000 kilobits/second, three sub-channels may be defined having bandwidths of 300, 500, and 200 kilobits/second. These three sub-channels may each carry network traffic between a backend server 108 and an application under test 104 on a client device 102. Each sub-channel may carry network traffic over a virtualized network having emulated network characteristics provided through the application of a network profile as described below, and the applied network profile may be different for each sub-channel.

In some implementations, the traffic modification module 114 operates to virtualize a network according to the network profile data 116 as described herein, and does not virtualize the backend server device(s) 108. In other implementations, the traffic modification module 114 may spoof or otherwise imitate at least some operations of the backend server device(s) 108 by sending traffic that appears, to the client device 102, to have been sent from the backend server device(s) 108.

Figure 2:
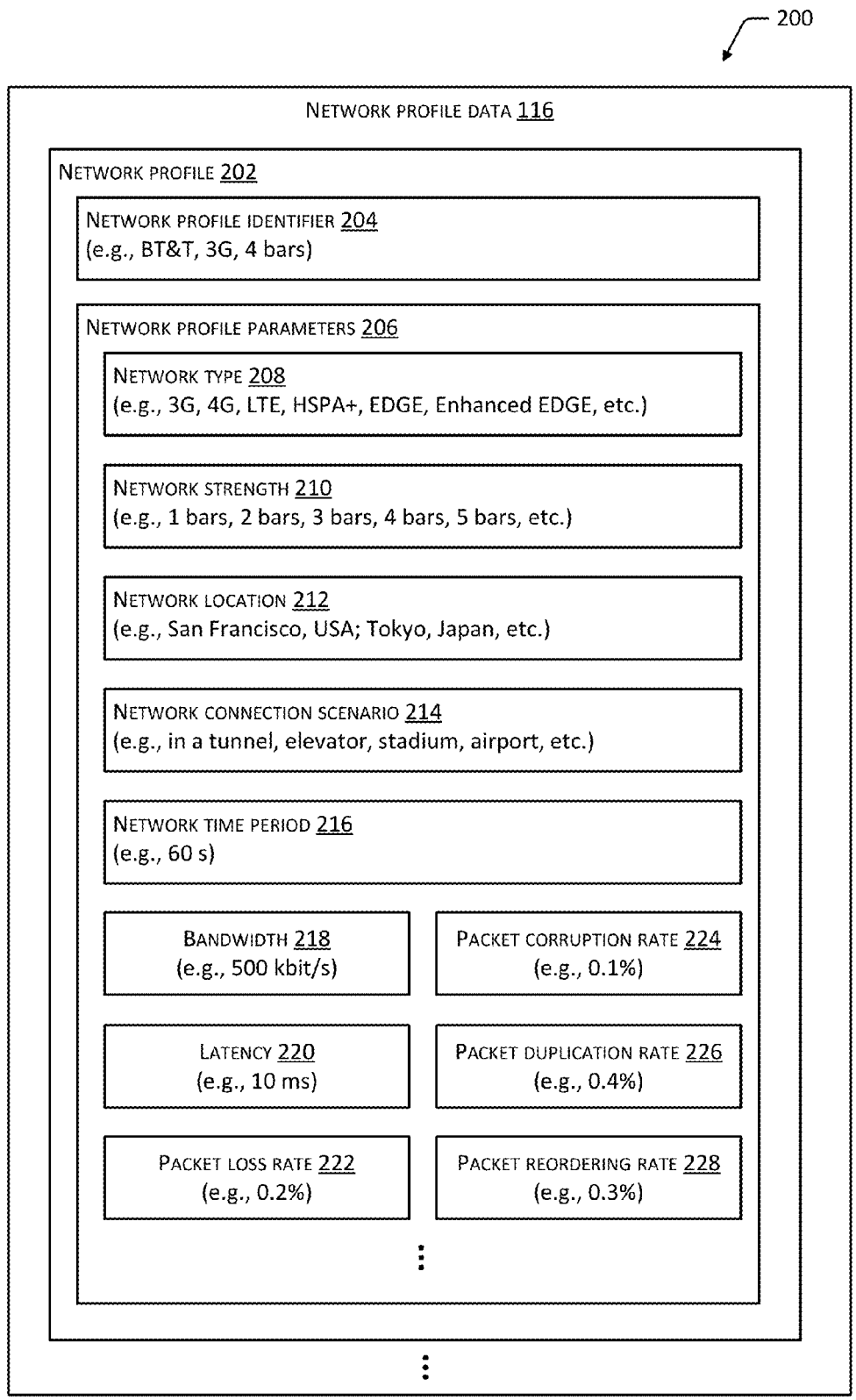
FIG. 2 depicts an example of network profile data that may be employed in dynamic traffic adjustment.

FIG. 2 depicts an example 200 of the network profile data 116 that may be employed in dynamic traffic adjustment operations described herein. The network profile data 116 may be stored in a one or more of a table, database, dataset, list, or other data structure. The network profile data 116 may include data for one or more network profiles such as network profile 202.

The network profile 202 may include a network profile identifier 204. The network profile identifier 204 may identify the network profile 202, and may enable a user or process to look up and access the network profile 202 from the network profile data 116 stored in data storage. In some cases, the network profile identifier 204 may be a unique identifier. In implementations, each network profile 202 may correspond to a particular type and strength of network for a particular telecommunication service provider, and the network profile identifier 204 may include information describing the type, strength, and telecommunication service provider associated with the network profile 202. For example, the network profile identifier 204 may be "BT&T, 3G, 4 bars" indicating that the network profile 202 is for a network of type 3G, with strength 4 bars, provided by a service provider BT&T.

The network profile 202 may include one or more network profile parameters 206 that provide data for various characteristics of the profiled network. In some implementations, network profile parameters 206 include a network type 208 describing a particular technology or protocol of the profiled network. The network type 208 may include a WWAN type, such as one or more of the following: a 3G network type, a 4G network type, a GSM network type, a GPRS network type, an EDGE network type, an Enhanced EDGE network type, a HSPA network type, a HSPA+ network type, a LTE network type. The network type 208 may also include a WLAN type such as a WiFi network type.

In some implementations, the network type 208 may provide for a network virtualization of a public, semi-public, or private WLAN provided by a business, government agency, school, university, and so forth. For example, the network type 208 may provide for a network virtualization of a public WiFi network provided at one or more locations of a bar, restaurant, coffee shop, library, airport, stadium, conference center, university, social club, and so forth.

Network profile parameters 206 may include a network strength 210, indicating a strength of the profiled network. In some implementations, the network strength 210 is described as a number of bars (e.g., 1, 2, 3, 4, or 5 bars) similar to what a user would see on the display of a mobile device. In some implementations, the network strength 210 may be a measurement of received radio frequency (RF) power as a received signal strength indication (RSSI).

Network profile parameters 206 may include a network location 212, corresponding to a geographic location or area where the network was profiled. The network location 212 may be described as a place name including one or more of a continent, a country, a state, a province, a region, a county, a parish, a city, a town, a neighborhood, a street, an address, a building, and so forth. The network location 212 may be described using postal codes, latitude and longitude coordinates, or other location descriptions.

In some implementations, the network profile parameters 206 may also include a network connection scenario 214 describing a particular circumstance or scenario in which the network was profiled. For example, the network for network profile 202 may have been profiled from inside a tunnel, an elevator, a parking garage, a cellar, a train, a ship, a stadium, a festival, an airport, or in other circumstances where network connectivity may be atypical. In some implementations, the network connection scenario 214 may include a description of a particular event occurring at a venue. For example, the network connection scenario 214 may include a description of a sporting event occurring at a stadium. Such an event may affect a profile of a WWAN or WLAN at or near the stadium, and increase latency, slow bandwidth, cause packet loss or corruption, or affect other of the network profile parameters 206 for the profiled network.

The network profile 202 may be associated with a particular telecommunication service provider that employs time division multiple access (TDMA), code division multiple access (CDMA), or some other channel access method for providing telecommunication service. The telecommunication service provider may employ a particular polling rate or polling window to poll the signal strength from cell towers. In some implementations, the network profile parameters 206 include a network time period 216 that corresponds to the polling rate or polling window of the telecommunication service provider for the network profile 202. For example, the network time period 216 may be derived from the polling rate, and related to the polling rate through a proportionality constant, offset by an additive or subtractive constant, or related through some other mathematical relationship. In some implementations, the network time period 216 is synchronized to be the same as or substantially the same as the polling rate. In implementations, the network time period 216 may be employed in analysis and modification of packet data for network traffic, as described further below.

Network profile parameters 206 may include a bandwidth 218 and a latency 220. The bandwidth 218 provides a measure of the speed of the profiled network, and may be described as a data rate per time (e.g., kilobits per second). The latency 220 provides a measure of the delay in communications over the profiled network, and may be described as a round trip time (RTT) to send a packet over the network and receive a reply.

Network profile parameters 206 may also include a packet loss rate 222, a packet corruption rate 224, a packet duplication rate 226, and a packet reordering rate 228. These rates may be described as a percentage or a proportion of the number of packets that are lost (e.g., dropped), corrupted, duplicated, or reordered respectively. Implementations may employ network profile parameters in addition to or instead of those described herein, to characteristic a particular network for the network profile 202. The network profile parameters 206 for the packet loss rate 222, the packet reordering rate 228, and others may provide for an emulation of packet jitter in the virtualized network.

In some implementations, the network profile 202 may include profiles for a plurality of networks to be virtualized. For example, the network profile 202 may include a plurality of sub-profiles, with each sub-profile including a set of the network profile parameters 206 such as the network type 208, the network strength 210, and so forth. In this way, implementations may enable network virtualization through an emulation of network conditions in a location that has multiple networks available.

Some implementations may support one or more relationships or associations between at least some of the network parameters 206. For example, in cases where the network connection scenario 214 indicates a stadium or another scenario in which a large number of users may be using a network, the bandwidth 218 may be decreased or the latency 220 may be increased to respectively emulate a decrease in the speed or an increase in the delay associated with the virtualized network.

Some implementations may provide a network profile 202 that includes two or more sets of the network profile parameters 206, with each set corresponding to a particular packet type for network communications. In some cases the network profile 202 may include a first set of the network profile parameters 206 to use when packets of a first protocol are being communicated over the virtualized network, a second set of the network profile parameters 206 to use when packets of a second network protocol are being communicated, and so forth. For example, the network profile 202 may include a first set of network profile parameters 206 for use with UDP packets, and a second set of network profile parameters 206 for use with TCP packets. Although this example describes differentiation based on different packet types at the transport level of the OSI model, embodiments are not so limited. Packet differentiation may be based on packet types at any level of the OSI model.

Moreover, some implementations may provide a network profile 202 that includes two or more sets of the network profile parameters 206, with each set corresponding to particular payload data included in the packets. For example, the network profile 202 may include a first set of the network profile parameters 206 to use when communicating packets that include payload data for a request to or a response from a domain name system (DNS) server, and a second set of the network profile parameters 206 to use when communicating other types of packets. In some cases, packets including data for a ping, a multicast, or other payload data may be associated with different sets of the network profile parameters 206.

In some implementations, the network profile 202 and its network profile parameters 206 may have been developed through measurements of a network provided by a telecommunication service provider, maintenance provider, performance audit provider, and so forth. Such measurements may have been taken in at least one particular geographic area that is stored in the network location 212, under at least one connection scenario that is stored in the network connection scenario 214, or under other circumstances.

In some implementations, the network profile 202 and its network profile parameters 206 may have been configured to differ at least in part from an actual network. Such configuration may be manually performed by a developer or tester of the application under test 104, by an administrator or user of the traffic modification server device(s) 110, or another individual. In some cases, the configuration of the network profile 202 may be through an automated process. Configuration of the network profile 202 and its network profile parameters 206 enables a network shaping of the virtualized network to test the application under test 104 under various hypothetical network connectivity conditions.

Figure 3:
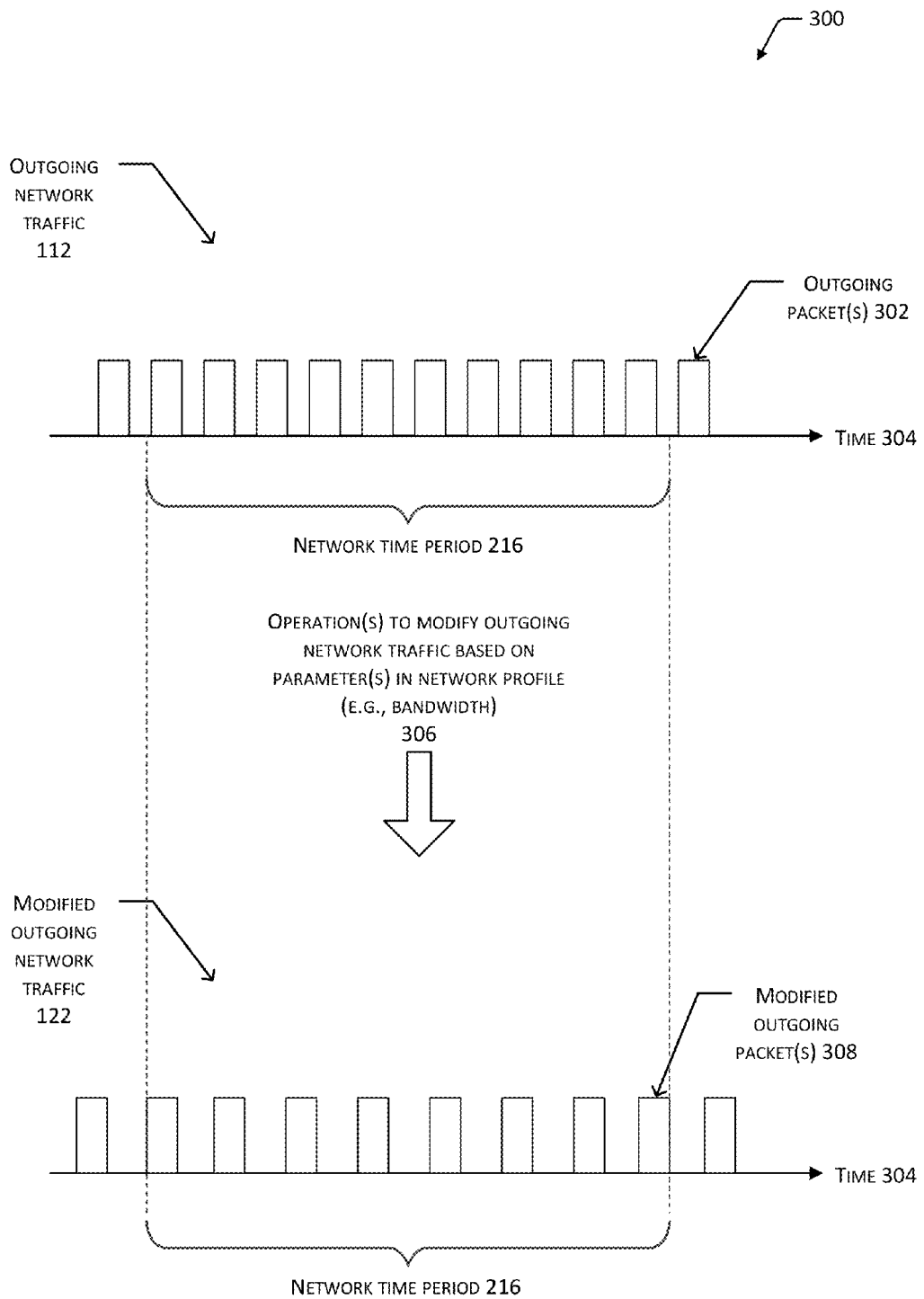
FIG. 3 depicts an example of a modification of network traffic based on one or more parameters of a network profile.

FIG. 3 depicts an example 300 of a modification of outgoing network traffic 112 based on one or more network profile parameters 206 of a network profile 202. In this example, the outgoing network traffic 112 includes one or more outgoing packets 302 of data, transmitted in sequence, with time 304 indicated along a horizontal axis. Implementations support any type of data packet that is formatted or unformatted. In some implementations, the outgoing packets 302 may be TCP/IP packets. A certain number of the outgoing packets 302 may be transmitted during the network time period 216, included as one of the network profile parameters 206 of the network profile 202.

In some implementations, traffic modification operations may be performed on a set of packets within the network time period 216. One or more operations 306 modify the outgoing network traffic 112 based on the network profile parameters 206 in the network profile 202, to emulate the network described by the network profile 202. In the example shown, the operation(s) 306 modify the outgoing network traffic 112 to apply the bandwidth 218, to emulate a speed of the profiled network. In this example, the outgoing network traffic 112 is throttled down to emulate a slower network.

As shown, the modified outgoing network traffic 122 includes modified outgoing packet(s) 308. In this example, the modified outgoing packet(s) 308 may include the same data as the outgoing packet(s) 302, but the packets may have a different start and end time to emulate a slower network speed. In this example, a number of the modified outgoing packet(s) 308 in the network time period 216 may be different than the number of the outgoing packet(s) 302 in the network time period 216. In other cases, various other network profile parameters 206 may be applied to drop, corrupt, duplicate, or reorder a percentage of the outgoing packet(s) 302 and to generate the modified outgoing packet(s) 308, by applying the packet loss rate 222, the packet corruption rate 224, the packet duplication rate 226, or the packet reordering rate 228 respectively.

Figure 4:
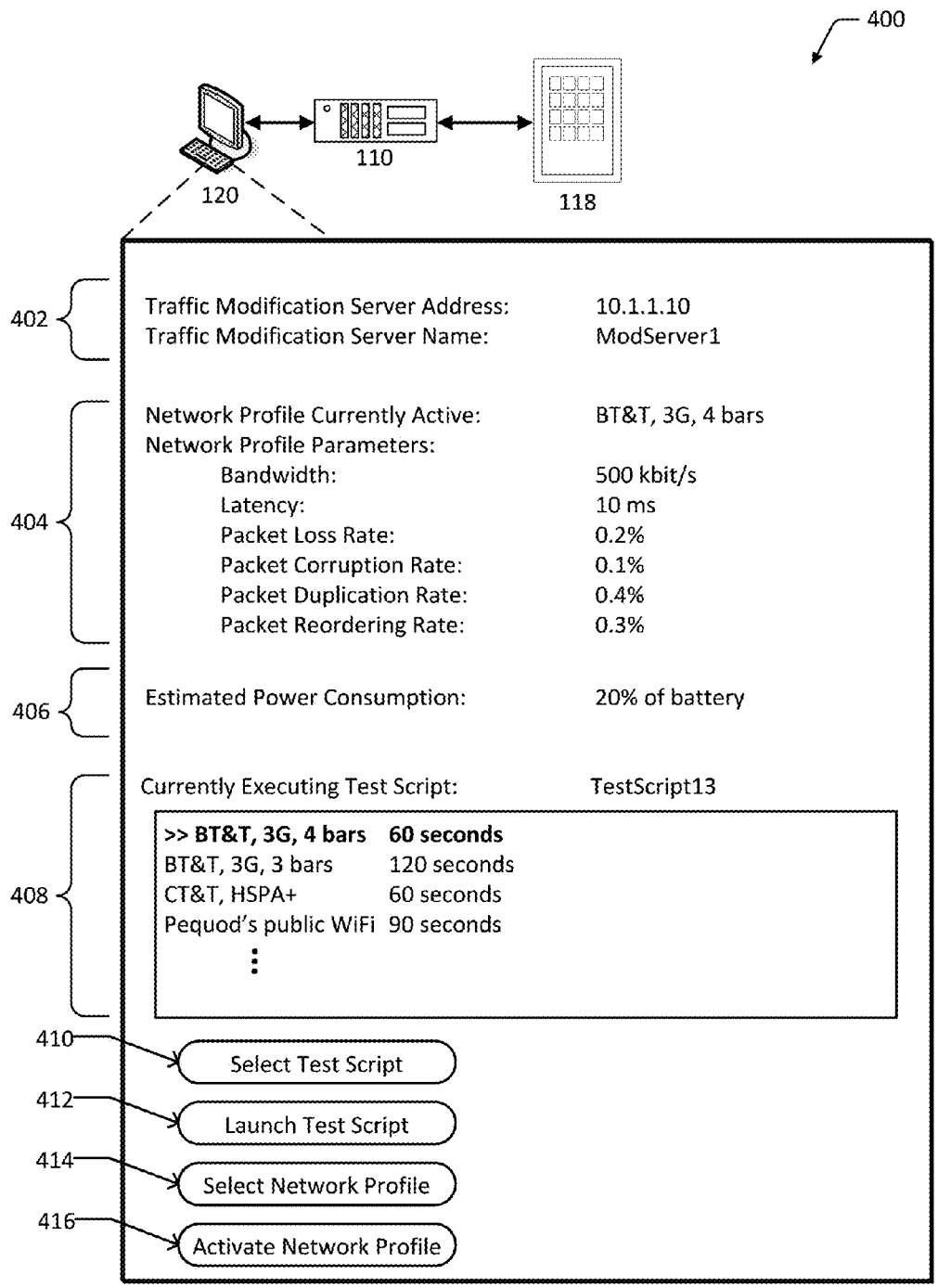
FIG. 4 depicts a user interface to manage dynamic traffic adjustment for network virtualization.

FIG. 4 depicts an example user interface 400 that may be provided by the traffic modification user interface module 118 of the traffic modification server device(s) 110. In some embodiments, the user interface 400 comprises a web interface suitable for viewing within a web browser running on a client device 102, a management device 120, or other device. In some implementations, the data provided by the user interface 400 may be copied into a file and reported to a user in the file, in an email, or through other means. In some implementations, the data provided by the interface 400 may be stored in a file or other data format or structure, and provided to a user or process in response to a request for the data.

The interface 400 may include a section 402, describing characteristics of the traffic modification server device(s) 110. Section 402 may include an address such as an IP address for the traffic modification server device(s) 110. In some implementations, the network traffic redirection module 106 may redirect traffic from the application under test 104 to the address listed in section 402. Section 402 may also include a name or other identifying information of the traffic modification server device(s) 110.

The interface 400 may include a section 404, describing the network profile 202. In some cases, the section 404 may list a currently active network profile, i.e., the network profile that is currently being employed to modify network traffic. Section 404 may provide the network profile identifier 204 of the currently active network profile. Section 404 may also list the network profile parameters 206, such as the bandwidth 218, the latency 220, the packet loss rate 222, the packet corruption rate 224, the packet duplication rate 226, or the packet reordering rate 228, or any other network profile parameters including but not limited those shown in FIG. 2.

In some implementations, the interface 400 includes a section 406 providing an estimated power consumption. This estimate may be provided as an amount of power consumed (e.g., in Watts or other units), or as a percentage of available battery power consumed. The power consumption estimate may be calculated based on the network(s) emulated and the amount of time spent emulating each network at the traffic modification server device(s) 110. A network described in a first network profile BT&T, 4G may consume 0.1% of battery per minute on a mobile device, and a network described in a second network profile CT&T, 3G may consume 0.8% of battery per minute on the mobile device. If each of these networks is emulated for 10 minutes, the estimated power consumption may be reported as 9% of battery. Such an estimate may provide a tester or other user with information regarding how an application under test 104 affects the device on which the application is running.

The interface 400 may include a section 408, providing information for a currently executing test script. Some implementations support the use of test scripts to control network emulation. In some implementations, the traffic modification user interface module 118 may run on a web server on the traffic modification server device(s) 110, and may accept commands in the form of HTTP requests such as GET, POST, PUT, and so forth. Such commands may be assembled into a script by a user, using a scripting language such as javascript, VBscript, or other scripting languages. In the example shown in section 408, a script is running that requests a first network profile "BT&T, 3G, 4 bars" run for 60 seconds, followed by a second network profile "BT&T, 3G, 3 bars" for 120 seconds, followed by a third network profile "CT&T, HSPA+" for 60 seconds, followed by a fourth network profile "Pequod's public WiFi" for 90 seconds to emulate a public WLAN for a business. In this way, a user may specify an emulation of networks in a scenario in which a device is moving between regions of different telecommunications service providers, different network types, different network strengths, or other differences in network profiles.

Some implementations expose an API, including API commands that a script may employ to specify various network profile parameters 206. The API commands may include one or more of the following:

setLocation: To virtualize a network at a particular location such as city, state, postal code, latitude/longitude coordinates, and so forth.

setCarrier: To virtualize a network provided by a particular telecommunication service provider.

setNetwork: To virtualize a network of a particular network type, such as 3G, 4G, EDGE, GPRS, Enhanced EDGE, LTE, HSPA+, WiFi, and so forth.

setBars: To virtualize a network with a particular network strength, such as 1, 2, 3, 4, or 5 bars.

createNewProfile: allows a user to generate a new network profile, to be stored as a part of the network profile data 116.

restoreDefaults: instructs the traffic modification module 114 to return to a default state for network virtualization. In some implementations, the default state is a WiFi network, or other network that connects the client device(s) 102 to the traffic modification server device(s) 110.

viewAllCarriers: returns a list of all supported telecommunications service providers listed in the network profile data 116.

airplaneMode: instructs the traffic modification module 114 to suspend all network traffic to or from the application under test 104. Such an instruction may enable a tester to test how the application under test 104 behaves under conditions of no network connectivity, or how the application under test 104 behaves during a transition into or out of a state of no network connectivity.

The API commands listed above are illustrative and non-limiting. Implementations may support commands with different names, different parameters, and different functionality.

In some implementations, the interface 400 may provide one or more controls such as buttons, dialogs, text boxes, dropdown lists, and the like, to enable a user to enter information or commands into the interface 400. For example, the interface 400 may include a control 410 to enable a user to select a test script to be executed, and a control 412 to enable a user to execute the selected test script. The interface 400 may also include a control 414 to enable a user to select a network profile, and a control 416 to activate the selected network profile.

Although FIG. 4 shows an example interface with various user interface elements in particular positions, the particular example arrangement shown is not in any way limiting of implementations. Accordingly, various implementations may employ a user interface that includes more or fewer user interface elements or controls, in any combination and in any arrangement to enable functionality of the implementations. Further, implementations may support multiple user interfaces (e.g., multi-page web sites) with functionality spread across various pages. Implementations may also support dynamically generated interfaces, where the particular user interface elements displayed and the location or duration of their display is based on a particular state of the system, particular characteristics of the user, the client device 102, the management device 120, or other factors.

Figure 5:
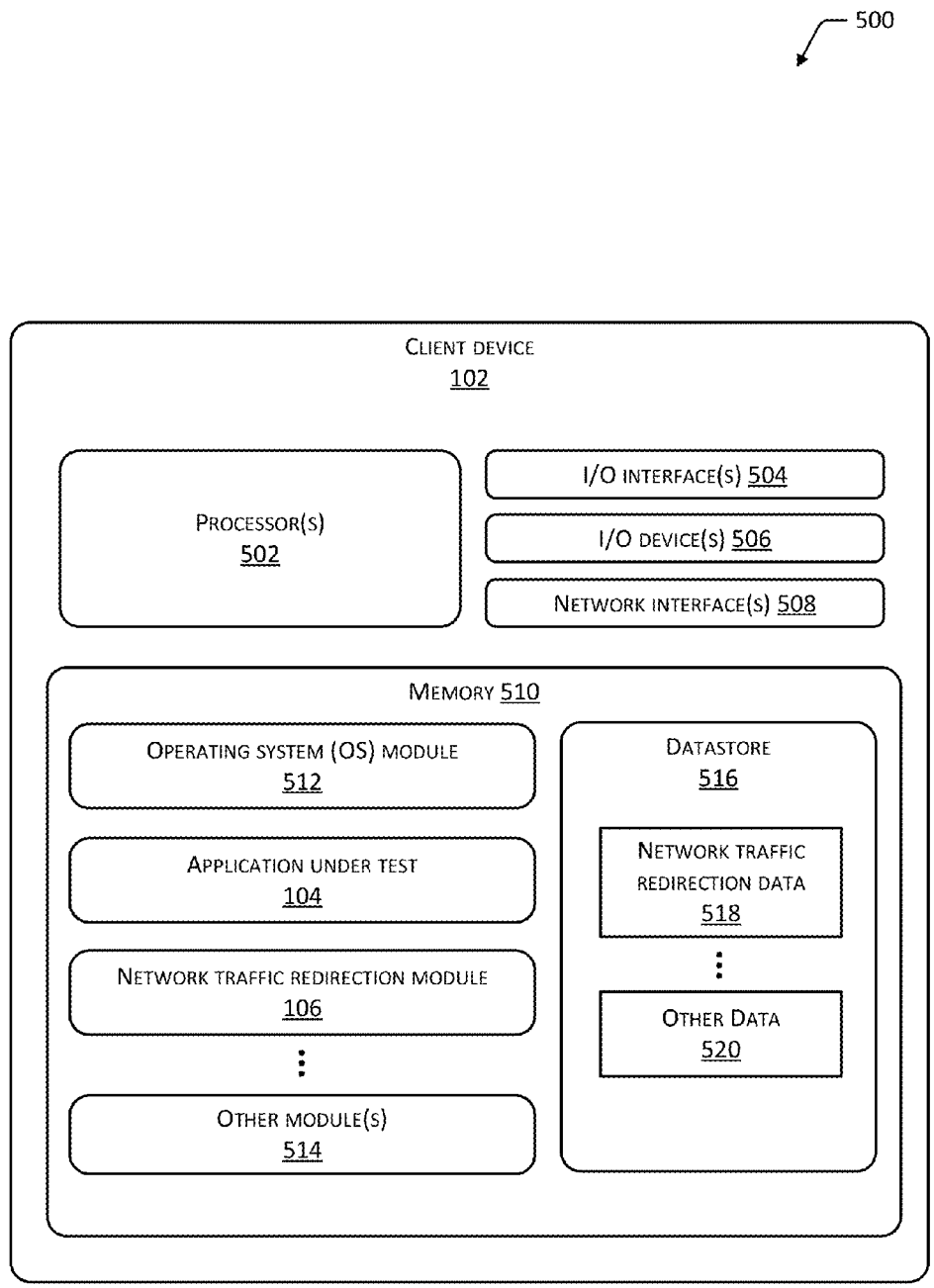
FIG. 5 depicts an example schematic for a client device that may operate in an environment for network virtualization.

FIG. 5 depicts a block diagram 500 of a client device 102 that may be used in implementations described herein. The client device 102 may include one or more processors 502 configured to execute one or more stored instructions. The processors 502 may comprise one or more cores.

The client device 102 may include one or more input/output (I/O) interface(s) 504 to allow the client device 102 to communicate with other devices. For example, the I/O interface(s) 504 may be configured to provide a universal serial bus (USB) connection compliant with the standards promulgated by the USB Implementers Forum, Inc. of Beaverton, Oreg.

The I/O interface(s) 504 may couple to one or more I/O devices 506. The I/O device(s) 506 may include user input devices such as one or more of a keyboard, a mouse, a pen, a game controller, a voice input device, a touch input device, a gestural input device, the other devices shown in FIG. 1, and so forth. The I/O device(s) 506 may include output devices such as one or more of a display, a printer, audio speakers, haptic output device, and so forth. In some embodiments, the I/O device(s) 506 may be physically incorporated with the client device 102 or be externally placed.

The client device 102 may also include one or more network interfaces 508 to enable communications between the client device 102 and other networked devices such as those depicted in FIG. 1. Such network interface(s) 508 may include one or more network interface controllers (NICs) or other types of transceiver devices configured to send and receive communications over the network(s). For example, the network interface(s) 508 may be configured to provide a WiFi connection compliant with one or more IEEE 802.11 standards such as 802.11g or 802.11n. The client device 102 may also include one or more busses or other internal communications hardware or software that allow for the transfer of data between the various modules and components of the client device 102.

The client device 102 includes one or more memories 510. The memory 510 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 510 provides storage of computer readable instructions, data structures, program modules, and other data for the operation of the client device 102.

The memory 510 may include at least one operating system (OS) module 512. The OS module 512 is configured to manage hardware resources such as the I/O interface(s) 504 and network interface(s) 508, and to provide various services to applications or modules executing on the processor(s) 502. In some implementations, the OS module 512 may comprise one or more mobile operating systems configured for execution on mobile computing devices. For example, the OS module 512 may implement one or more of iOS® from Apple Corp. of Cupertino, Calif.; Windows Mobile® from Microsoft Corp. of Redmond, Wash.; Android® from Google, Corp. of Mountain View, Calif. and its derivatives from various sources; Palm OS® from Palm Computing, Inc. of Sunnyvale, Calif. and its derivatives from various sources; BlackBerry OS® from Research In Motion Ltd. of Waterloo, Ontario, Canada; or other operating systems such as VxWorks from Wind River Systems of Alameda, Calif. In cases where the OS module 512 implements a version of iOS®, any version of iOS® may be supported including iOS 1.x, 2.x, 3.x, 4.x, 5.x, 6.x, or higher versions, including any version of iOS® for the iPhone®, iPad®, iPad Touch®, or any other compatible device. In cases where the OS module 512 implements a version of Android®, any version of Android® may be supported including but not limited to versions 2.3.x "Gingerbread," 4.0.x "Ice Cream Sandwich," 4.1.x "Jelly Bean," and so forth.

The memory 510 may include the application under test 104, the network traffic redirection module 106, or other module(s) 514. In some implementations, the network traffic redirection module 106 may be part of an OS of the client device 102, as a part of the network communications stack of an OS. The network traffic redirection module 106 may also be included in an OS utility application that enables a user of the client device 102 to select a network for communications between the client device 102 and other devices, or specify an address of the traffic modification server device(s) 110 as a proxy for network traffic sent by the client device 102.

In some implementations, the network traffic redirection module 106 may be an application installed on the client device 102 by a user of the client device 102 to redirect traffic sent by the client device 102. In some cases, one or more modifications may be made to the client device 102, for example to root or to jailbreak the client device 102, prior to installation of the network traffic redirection module 106.

The memory 510 also includes a datastore 516 to store information for operations of the client device 102. The datastore 516 may comprise a database, array, structured list, tree, or other data structure. In some implementations, the datastore 516 may store network traffic redirection data 518 including an address of the traffic modification server device(s) 110, or other information describing a destination for network traffic sent by the client device 102. Other data 520 may also be stored, such as user account information, network connectivity data, application testing result data, test scripts, network virtualization data, power consumption data, and so forth.

Figure 6:
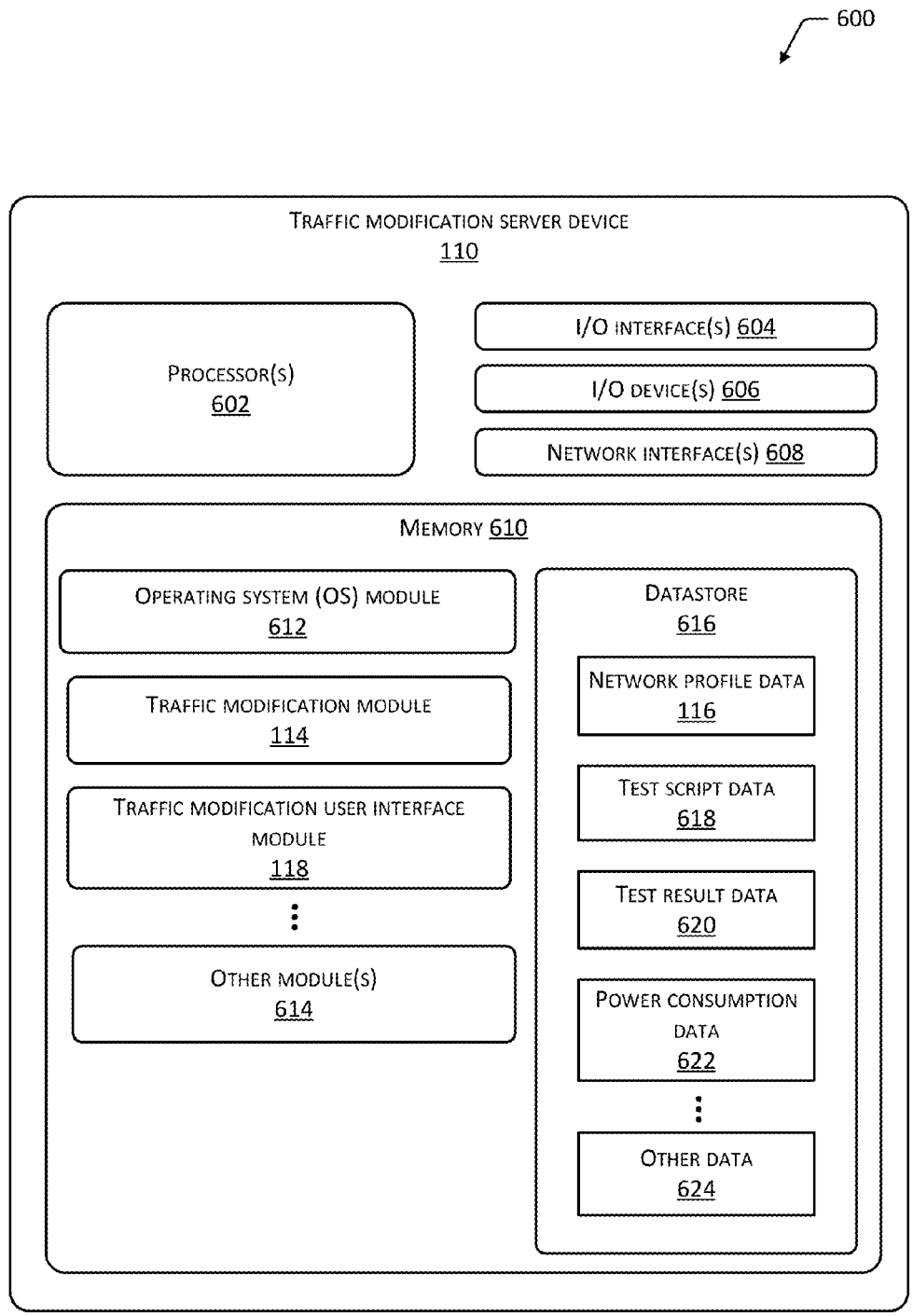
FIG. 6 depicts an example schematic for a traffic modification server device that may operate in an environment for network virtualization.

FIG. 6 depicts a block diagram 600 of the traffic modification server device 110 that may be used in implementations described herein. The traffic modification server device 110 may include one or more processors 602 configured to execute one or more stored instructions. The processors 602 may comprise one or more cores.

The client device 102 may include one or more I/O interface(s) 604 to allow the traffic modification server device 110 to communicate with other devices. The I/O interface(s) 604 may couple to one or more I/O devices 606. The I/O device(s) 606 may include user input devices such as one or more of a keyboard, a mouse, a pen, a game controller, a voice input device, a touch input device, a gestural input device, the other devices shown in FIG. 1, and so forth. The I/O device(s) 606 may include output devices such as one or more of a display, a printer, audio speakers, haptic output device, and so forth. In some embodiments, the I/O device(s) 606 may be physically incorporated with the traffic modification server device 110 or be externally placed.

The traffic modification server device 110 may also include one or more network interfaces 608 to enable communications between the traffic modification server device 110 and other networked devices such as those depicted in FIG. 1. Such network interface(s) 608 may include one or more network interface controllers (NICs) or other types of transceiver devices configured to send and receive communications over network(s). For example, the network interface(s) 608 may be configured to provide a WiFi connection compliant with one or more IEEE 802.11 standards such as 802.11g or 802.11n, or an Ethernet connection compliant with the IEEE 802.3 standard. The traffic modification server device 110 may also include one or more busses or other internal communications hardware or software that allow for the transfer of data between the various modules and components of the traffic modification server device 110.

The traffic modification server device 110 includes one or more memories 610. The memory 610 comprises one or more computer-readable storage media ("CRSM"). The CRSM may be any one or more of an electronic storage medium, a magnetic storage medium, an optical storage medium, a quantum storage medium, a mechanical computer storage medium, and so forth. The memory 610 provides storage of computer readable instructions, data structures, program modules, and other data for the operation of the traffic modification server device 110.

The memory 610 may include at least one OS module 612. The OS module 612 is configured to manage hardware resources such as the I/O interface(s) 604 and network interface(s) 608, and to provide various services to applications or modules executing on the processor(s) 602. In some implementations, the OS module 612 may comprise a distribution or variant of the Linux® operating system originally released by Linus Torvalds.

The memory 610 may also include the traffic modification module 114. Operations of the traffic modification module 114 are further described with reference to FIGS. 7-9. The memory 610 may include the traffic modification user interface module 118, and one or more other modules 614. These other modules 614 may include, but are not limited to, user authentication modules, access control modules, billing modules, scripting language interpreters to execute test scripts, and so forth.

In some embodiments, the memory 610 also includes a datastore 616 to store information for operations of the traffic modification server device 110. The datastore 616 may comprise a database, array, structured list, tree, or other data structure. The datastore 616 may store the network profile data 116. The datastore 616 may also store test script data 618, including one or more test scripts for network virtualization such as those described above with regard to FIG. 4. Datastore 616 may store test result data 620, power consumption data 622, or other data 624. Other data 624 may include user account or authentication information, data regarding the operation of the traffic modification server device 110, data provided by the interface 400, and so forth.

FIG. 7 depicts a flow diagram 700 of a process for network virtualization through dynamic traffic adjustment. The process includes operations that may be performed on the client device 102, the traffic modification server device 110, or both the client device 102 and the traffic modification server device 110. In some implementations, the operations may be performed by the traffic modification module 114.

At 702, an indication is received of the network profile 202 to be applied to network traffic between the client device(s) 102 and the backend server device(s) 108. In some cases, this indication may be provided by a user through the traffic management user interface module 118. The indication may be provided through a script sending commands to an API of the traffic management user interface module 118. The network profile 202 may be indicated using the network profile identifier 204 to select a network profile 202 stored in the network profile data 116.

At 704, one or more outgoing packets of network traffic may be intercepted. In some cases, the intercepted traffic is outgoing network traffic 112 sent from the client device 102 and addressed to the backend server device 108. In some cases, the outgoing packets are generated by the application under test 104 as part of a communications session with a process or service executing on the backend server device 108.

At 706, the intercepted outgoing packet(s) may be adjusted based on the applied network profile 202. This adjustment may include applying the one or more network profile parameters 206 of the network profile 202, to modify one or more packets of the outgoing network traffic 112. In some implementations, the adjustment is based on the network time period 216, such that one or more packets received during the network time period 216 are intercepted and adjusted. As described above, the network time period 216 may be synchronized with or otherwise correspond to a polling window or polling rate of a telecommunication service provider whose network is being virtualized through application of the network profile 202. The packet adjustment operations of 706 are further described with reference to FIG. 8. At 708, the adjusted outgoing packet(s) are sent to the backend server device 108, as part of the modified outgoing network traffic 122.

At 710, one or more incoming packets of network traffic are intercepted. In some implementations, the one or more incoming packets are sent from the backend server device 108 and addressed to the client device 102. In some cases, the one or more incoming packets may include response data in response to the outgoing packet(s) sent to the backend server device 108. The intercepted incoming packet(s) may be part of the incoming network traffic 124.

At 712, the incoming packet(s) are adjusted based on the applied network profile, as further described with reference to FIG. 8. As discussed above, in some implementations the adjustment is based on the network time period 216, such that one or more incoming packets received during the network time period 216 are intercepted and adjusted. Implementations support adjustments to the outgoing network traffic 112, adjustments to the incoming network traffic 124, or adjustments to both the outgoing network traffic 112 and the incoming network traffic 124. At 714, the adjusted incoming packet(s) are sent to the client device 102, as part of the modified incoming network traffic 126.

In some implementations, at 716 the incoming packet(s) are analyzed and validated. In some cases, the data of the incoming packet(s) may be analyzed to determine whether a source address of the incoming packet(s) (e.g., an IP address of the backend server device(s) 108) has changed relative to previous incoming packet(s) received. In some cases, a payload size of the incoming packet(s) may be analyzed to determine whether the payload size has changed relative to previous incoming packet(s) received. In some cases, the data of the incoming packet(s) may be compared to expected data to validate a response from the backend server device(s) 108. Implementations support other operations to analyze or validate the incoming packet(s).

At 718, a determination is made whether an indication has been received of a different network profile to apply for network virtualization. If so, then at 720 the different network profile is applied, and the process continues from 704. If not, then the process continues from 704. As described with regard to 702, an indication of a changed network profile may be received through the traffic management user interface module 118. The indication may be provided through a script sending commands to an API of the traffic modification user interface module 118. The network profile 202 may be indicated using the network profile identifier 204 to select a network profile 202 stored in the network profile data 116. A change in network profile may emulate a movement of the client device 102 between regions of different network connectivity strengths, different network types, network telecommunication service providers, and so forth. This emulation of a network change may be performed even though the client device 102 physically remains substantially stationary.

In some implementations, the adjustments made at 706 and 712 may be made to all of the outgoing packets that are received from the client device 102, or all of the incoming packets that are addressed to the client device 102. In some implementations, the received packets may be filtered to select and adjust those outgoing packets that originate from the application under test 104, or to select and adjust those incoming packets that are addressed to the application under test 104. In some implementations, the received packets may be filtered to select and adjust those outgoing packets that are addressed to the backend server device 108, or to select and adjust those incoming packets that originate from the backend server device 108.

FIG. 8 depicts a flow diagram 800 of a process for traffic adjustment based on one or more network profile parameters 206 of a network profile 202. The process includes operations that may be performed on the client device 102, the traffic modification server device 110, or both the client device 102 and the traffic modification server device 110. In some implementations, the operations may be performed by the traffic modification module 114.

At 802, a packet size of one or more packets may be modified, based on the network type 208 included in the network profile 202 being applied. In some cases, the network type 208 being virtualized through application of the network profile 202 may be different than the network type over which the packets are received. For example, the outgoing network traffic 112 may be sent from the client device 102 over a WiFi network that has a packet size (e.g., a maximum transmission unit (MTU)) of 1518 bytes, or over a wired Ethernet connection with packet size 8192 bytes. In cases where the applied network type 208 is a WAN type of 3G, 4G, and the like, the packet size may be 64 bytes. Accordingly, the received packets may be repacketized into smaller or larger packets before being sent on. In such cases, the data carried by the packets in their payload may not change as the packet size is altered.

At 804, a packet timing may be changed based on the one or more bandwidth parameters 218 in the network profile 202. In some cases, to emulate a slower network speed or bandwidth, the timing of packets in a set of packets may be altered, as shown in the example of FIG. 3.

At 806, a packet timing may be changed based on the one or more latency parameters 220 in the network profile 202. To simulate a latency or delay in the network profiled by network profile 202, one or more of the packets may be delayed before being sent on. In some cases, the one or more latency parameters 220 may include a parameter indicating a latency of the virtualized network when communicating packets for a DNS response or request. In such cases, at least one of the packets that includes DNS request or response data may be delayed based on the latency parameter 220 that is particularly associated with DNS traffic. Operations associated with DNS traffic are described in further detail with reference to FIG. 9.

At 808, a portion (i.e., one or more) of the received packets may be dropped or deleted, to emulate a packet loss rate indicated by one or more packet loss rate parameters 222. In some cases, portion of the received packets in the network time period 216 may be selected randomly and dropped, according to the packet loss rate 222. In other cases, the selection may be pseudo-random or not random. For example, to simulate a 20% packet loss rate 222, every fifth packet may be dropped.

At 810, a portion of the received packets may be corrupted, to emulate a packet corruption rate indicated by one or more packet corruption rate parameters 224. The selection of packets to be corrupted may be random, pseudo-random, or non-random. In some implementations, packet corruption may be performed by randomizing at least a portion of the payload or header of a packet, by deleting data from the payload or header of the packet, by injecting data into the payload or header of the packet, or through other means.

At 812, a portion of the received packets may be duplicated, to emulate a packet duplication rate indicated by one or more packet duplication parameters 226. The selection of packets to be duplicated may be random, pseudo-random, or non-random. In some implementations, packet duplication may be performed by inserting a copy of a packet before or after the packet in the network traffic. Insertion may be immediately before or after, or a certain number of packets removed from the duplicated packet.

At 814, a portion of the received packets may be reordered, to emulate a packet reordering rate indicated by one or more packet reordering rate parameters 228. The selection of packets to be reordered may be random, pseudo-random, or non-random.

Implementations support applying any of the above-described network profile parameters 206 or other parameters, in any combination and in any order to achieve the desired network virtualization. The steps may be applied to at least some packets of the outgoing network traffic 112, to at least some packets of the incoming network traffic 124, or to at least some packets of both the outgoing network traffic 112 and the incoming network traffic 124.

At 816, in some implementations at least a portion of the packets may be further modified based on a packet type. In some cases, a speed or bandwidth of the virtualized network may at least partly determine a type of packet that is sent over the network. For example, the application under test 104 or the client device 102 may determine to send traffic in the form of UDP packets over a network that has a higher bandwidth compared to other networks. To emulate traffic on such a network, implementations may drop a portion of received TCP packets that are associated with TCP synchronization, such as the SYN or ACK packets.

FIG. 9 depicts a flow diagram 900 of a process for traffic adjustment based on one or more parameters of a network profile, for traffic that includes DNS traffic. The process includes operations that may be performed on the client device 102, the traffic modification server device 110, or both the client device 102 and the traffic modification server device 110. In some implementations, the operations may be performed by the traffic modification module 114.

At 902, the payload data of one or more packets is analyzed. The analyzed packets may include at least one packet in the outgoing network traffic 112, at least one packet in the incoming network traffic 124, or both outgoing and incoming packets.

At 904, based on the analysis a determination is made whether the packet(s) include DNS traffic such as a DNS resolution request from the client device 102 to a DNS server, or a response to the client device 102 from a DNS server. If the determination is negative, the process may continue analyzing subsequent packets at 902.

If the determination is positive, at 906 one or more packets are modified to alter a DNS server address included in the payload for the packet(s). In some implementations, the network profile 202 may include information describing a DNS server that devices connected to the profiled network may use to request DNS information, such as resolving a host name to an IP address. The client device 102 may, under normal circumstances, send DNS requests to a default DNS server that is different than that included in the network profile 202. Accordingly, to virtualize the profiled network, implementations may intercept DNS traffic sent from the client device 102 to its default DNS server, and redirect that traffic to the DNS server included in the network profile 202.

At 908, the packet timing of the packet(s) may be altered based on a latency parameter that is specific to DNS traffic. For example, in some cases the DNS server associated with the profiled network may have a particular latency or delay in responding to DNS requests. That particular latency may have been measured during the development of the network profile 202, and stored as a DNS-specific latency parameter in the network profile 202. Implementations may introduce a delay in sending at least some of the packet(s), to simulate the latency in the DNS server associated with the virtualized network.

At 910, the packet(s) may be adjusted based on one or more other network profile parameters 206 that are specific to DNS traffic. For example, during the development of a network profile for a network, a DNS server associated with the network may have been determined to drop a proportion of incoming packets. The network profile 202 may include a packet loss rate parameter for traffic to the DNS server. Although FIG. 9 shows an example process performing steps 906, 908, and 910, various implementations may perform one or more of steps 906, 908, and 910, in any combination and in any order.

At 912, in some implementations information may be collected regarding the DNS traffic. This information collection may include logging some or all of the DNS packet data and analyzing the data to determine which DNS server is being used, performance statistics regarding the DNS server (e.g., latency, etc.), a number of network hops to reach the DNS server, and other data. In some cases, the collected information may be employed to update the network profile parameters 206 that are associated with DNS traffic to or from the DNS server.

Figure 10:
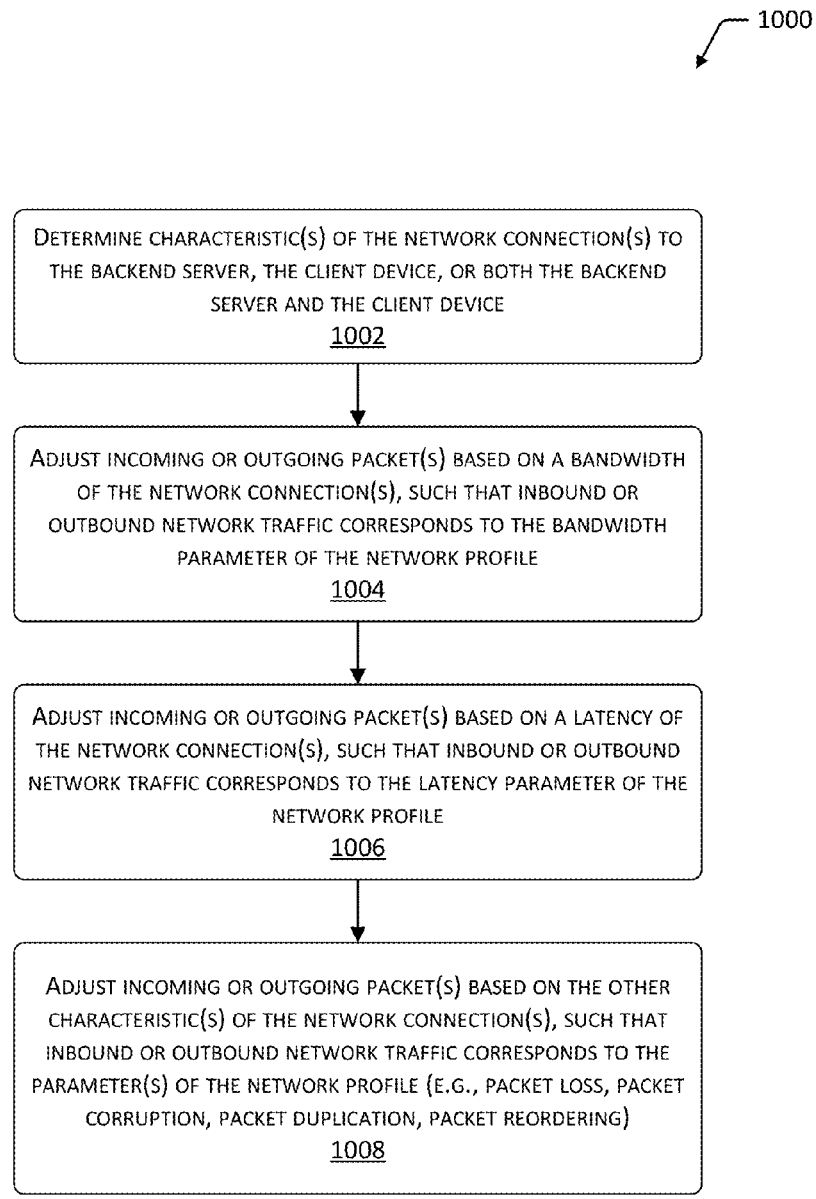
FIG. 10 depicts a flow diagram of a process for traffic adjustment based on one or more parameters of a network profile and one or more determined characteristics of a network connection.

FIG. 10 depicts a flow diagram 1000 of a process for traffic adjustment based on one or more network profile parameters 206 of a network profile 202 and one or more determined characteristics of a network connection. The process includes operations that may be performed on the client device 102, the traffic modification server device 110, or both the client device 102 and the traffic modification server device 110. In some implementations, the operations may be performed by the traffic modification module 114.

In some implementations, the network(s) connecting the traffic modification server device(s) 110 to one or both of the client device 102 and the backend server 108 may be monitored, and characteristics of the network(s) may be measured or otherwise determined. Such characteristics may include a current bandwidth, latency, rates of packet loss, duplication, corruption, or reordering, or other network characteristics. The process may further adjust one or both of the incoming and outgoing packets based on these determined characteristics, to ensure that the network is virtualized according to the network profile 202.

At 1002, one or more characteristics are determined for the network connection(s) to one or both of the client device 102 and the backend server device 108. This determination may be made by the traffic modification server device(s) 110, using a packet sniffing utility or other tools. This determination may also be made by an external device, and the data provided to the traffic modification server device(s).

At 1004, the incoming or outgoing packets are further adjusted based on a current bandwidth of the network connection(s), such that the modified outgoing network traffic 122 or the modified incoming network traffic 126 as actually transferred corresponds to the bandwidth 218 of the network profile 202. This adjustment may include altering a timing of the packets.

At 1006, the incoming or outgoing packets are further adjusted based on a current latency of the network connection(s), such that the modified outgoing network traffic 122 or the modified incoming network traffic 126 as actually transferred corresponds to the latency 220 of the network profile 202. This adjustment may include altering a timing of the packets.

At 1008, the incoming or outgoing packets are further adjusted based on other characteristics of the network connection(s), such as a packet loss rate, packet corruption rate, packet duplication rate, or packet reordering rate. Such adjustments may be made so that the modified outgoing network traffic 122 or the modified incoming network traffic 126 as actually transferred corresponds to network profile parameters 206 of the network profile 202.

Figure 11:
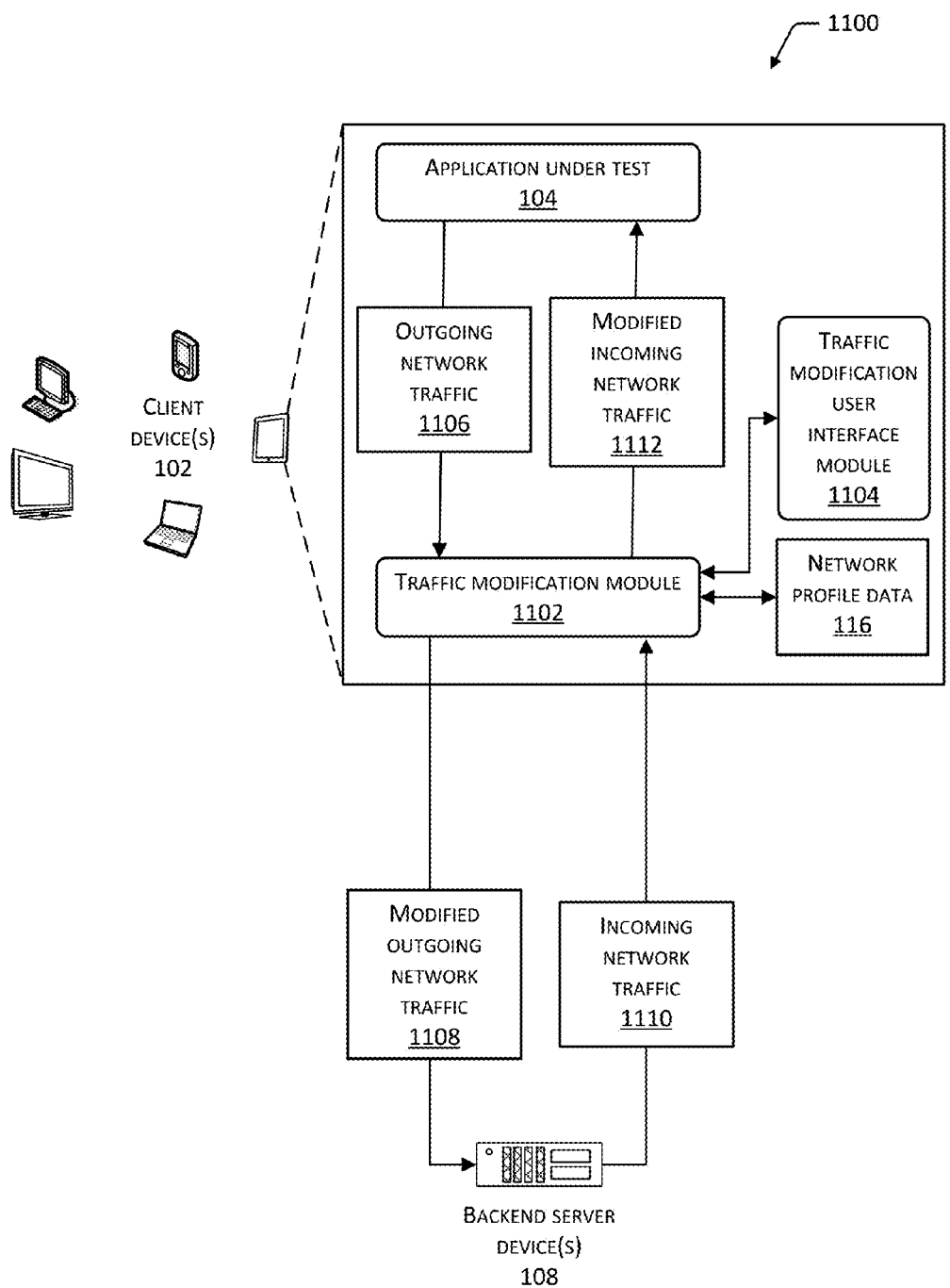
FIG. 11 depicts an environment for network virtualization through client-side dynamic traffic adjustment.

FIG. 11 depicts an environment 1100 for network virtualization through client-side dynamic traffic adjustment. In some implementations, the network traffic adjustment operations described above may be performed on the client device 102 in addition to or instead of being performed on the traffic modification server device(s) 110.

As shown in FIG. 11, the client device 102 may include a traffic modification module 1102, and may store the network profile data 116. In some implementations, the client device 102 may have access to the network profile data 116 stored on an external device. In some implementations, the client device 102 may include a traffic modification user interface module 1104 that provides a user interface. Such a user interface may include similar features to that shown in FIG. 4, and may enable a user to manage or control operations of the traffic modification module 1102, or receive information regarding the network virtualization.

The traffic modification module 1102 may intercept outgoing network traffic 1106 generated or sent by the application under test 104, and perform traffic modification operations as described above. The traffic modification module 1102 may then send the modified outgoing network traffic 1108 to the backend server device(s) 108.

The backend server device(s) 108 may generate and send incoming network traffic 1110 to the client device 102. The incoming network traffic 1110 may be intercepted and modified by the traffic modification module 1102 as described above, and modified incoming network traffic 1112 is sent to the application under test 104.

Those having ordinary skill in the art will readily recognize that certain steps or operations illustrated in in the figures above can be eliminated, combined, subdivided, executed in parallel, or taken in an alternate order. Moreover, the methods described above may be implemented as one or more software programs for a computer system and are encoded in a computer-readable storage medium as instructions executable on one or more processors.

Separate instances of these programs can be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A method, comprising:
receiving an indication at a traffic modification server of a network profile to be applied to network traffic, the network profile comprising a network type, one or more network profile parameters, an identification of a telecommunication service provider, and a time period corresponding to a network service polling rate, and wherein the one or more network profile parameters comprise: a packet corruption rate parameter, a packet duplication rate parameter, and a packet reordering rate parameter;
intercepting a first plurality of packets included in the network traffic using the traffic modification server;
identifying a first packet of the first plurality of packets received during the time period using the traffic modification server;
generating a battery power consumption estimate based at least on the identification of the telecommunication service provider of the network profile;
adjusting the first plurality of packets to virtualize the network using the traffic modification server, wherein the adjusting comprises: applying the one or more network profile parameters to modify the first plurality of packets through packet corrupting based at least on the packet corruption rate parameter, packet duplicating based at least on the packet duplication rate parameter, and packet reordering based at least on the packet reordering rate parameter; and
sending the adjusted first plurality of packets from the traffic modification server.

2. The method of claim 1, further comprising:
intercepting a second plurality of packets included in the network traffic using the traffic modification server;
adjusting a second packet of the second plurality of packets based at least in part on the network profile using the traffic modification server; and
sending the adjusted second packet from the traffic modification server.

3. The method of claim 1, wherein the network profile further includes at least one of a network strength, a network connection scenario, or a geographic location.

4. The method of claim 1, wherein the network type includes at least one of:
a 3G network type,
a 4G network type,
a Global System for Mobile Communication (GSM) network type,
a General Packet Radio Service (GPRS) network type,
an Enhanced Data Rates for GSM Evolution (EDGE) network type,
an Enhanced EDGE network type,
a High Speed Packet Access (HSPA) network type,
a HSPA+ network type,
a Long Term Evolution (LTE) network type, and
a Wireless Local Area Network (WLAN) network type.

5. The method of claim 1, wherein the one or more network profile parameters further include: a network bandwidth parameter.

6. The method of claim 1, wherein the network profile further comprises a latency parameter that is based on at least one latency associated with a domain name system (DNS) request.

7. The method of claim 1, wherein the time period is synchronized to the network polling rate.

8. The method of claim 1, further comprising measuring at least one characteristic of a network connection, wherein the adjusting the first plurality of packets is further based on the at least one characteristic of the network connection.

9. The method of claim 8, wherein the at least one characteristic includes at least one of a bandwidth or a latency of the network connection.

10. One or more non-transitory computer readable media storing instructions which, when executed, instruct at least one processor to perform operations comprising:

receiving an indication of a first network profile to be applied to network traffic, the first network profile including a first network type, a first set of network profile parameters, a first identification of a telecommunication service provider, and a first time period corresponding to a first network service polling rate, wherein the first set of network profile parameters comprise: a first packet corruption rate parameter, a first packet duplication rate parameter, and a first packet reordering rate parameter;

receiving a plurality of packets included in the network traffic;

generating a battery power consumption estimate based at least on the first identification of the telecommunication service provider on the first network profile;

modifying the plurality of packets, based at least partly on the first set of network profile parameters by packet corrupting based at least on the first packet corruption rate parameter, packet duplicating based at least on the first packet duplication rate parameter, and packet reordering based at least on the first packet reordering rate parameter; and sending at least the modified plurality of packets.

11. The one or more non-transitory computer readable media of claim 10, wherein the operations further comprise:

receiving an indication of a second network profile to be applied to the network traffic, the second network profile including a second set of network profile parameters that at least partly differ from the first set of network profile parameters; and modifying a second packet of the plurality of packets, based at least partly on the second set of network profile parameters, wherein the second packet is modified after the plurality of packets is modified.

12. The one or more non-transitory computer readable media of claim 10, wherein the operations further comprise modifying a packet size of the plurality of packets to correspond to the first network type.

13. The one or more non-transitory computer readable media of claim 10, wherein the network traffic involve a client, wherein the client comprises a mobile device or an emulation of a mobile device, and wherein the battery power consumption estimate comprises a battery power consumption estimate of the client.

14. The one or more non-transitory computer readable media of claim 13, wherein the client is configured to receive the plurality of packets and to modify the plurality of packets.

15. A server, comprising:

at least one memory, storing processor-executable instructions;

at least one processor configured to access the at least one memory and execute the processor-executable instructions to:

intercept a plurality of packets;

generating a battery power consumption estimate based at least on an identification of a telecommunication service provider of a network profile;

modify the plurality of packets, based at least partly on the network profile comprising a network type, one or more network profile parameters, the identification of the telecommunication service provider, and a time period corresponding to a network service polling rate, wherein the one or more network profile parameters comprise a packet corruption rate parameter, a packet duplication rate parameter, and a packet reordering rate parameter by:

packet corrupting based at least on the packet corruption rate parameter, packet duplicating based at least on the packet duplication rate parameter, and packet reordering based at least on the packet reordering rate parameter; and send at least the modified plurality of packets.

16. The server of claim 15, wherein the processor-executable instructions are further configured to:

receive a second plurality of packets;

modify a second packet of the second plurality of packets, based at least partly on the network profile; and send at least the modified second packet.

17. The server of claim 15, wherein the network type comprises a first network type, and wherein the processor-executable instructions are further configured to modify a packet size of the plurality of packets to correspond to a second network type that differs from the first network type.

18. The server of claim 17, wherein the first network type is a Wireless Local Area Network (WLAN) type, and wherein the second network type is a Wireless Wide Area Network (WWAN) network type.

19. The server of claim 15, wherein the one or more network profile parameters are based at least in part on one or more measured network performance characteristics.

20. The server of claim 15, wherein the plurality of packets comprise a packet that has been redirected to the server.

\* \* \* \* \*